(12) United States Patent
Eiger et al.

(10) Patent No.: US 8,301,026 B2
(45) Date of Patent: Oct. 30, 2012

(54) NETWORK RESTORATION UNDER DUAL FAILURES USING PATH PROTECTING PRECONFIGURED CYCLES

(75) Inventors: Martin I. Eiger, Montville, NJ (US); Hanan Luss, Marlboro, NJ (US); David F. Shallcross, Piscataway, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 409 days.

(21) Appl. No.: 12/557,837

(22) Filed: Sep. 11, 2009

(65) Prior Publication Data

US 2011/0064404 A1    Mar. 17, 2011

(51) Int. Cl.
*H04J 14/00* (2006.01)
(52) U.S. Cl. .................................. 398/57; 398/1; 398/2
(58) Field of Classification Search .................. 398/1–2, 398/57
See application file for complete search history.

(56) References Cited

OTHER PUBLICATIONS

Doucette, J., et al., "Enhanced failure-specific p-cycle network dual-failure restorability design and optimization". Journal of Optical Networking, vol. 8, No. 1., Jan. 2009.
Baloukov, D. et al., "Toward jointly optimized design of failure-independent path-protecting p-cycle networks". Journal of Optical Networking, vol. 7, No. 1., Jan. 2008.
Chow, T.Y., et al., "Fast Optical Layer Mesh Protection Using Pre-Cross-Connected Trails". IEEE/ACM Transactions on Networking, vol. 12, No. 3, Jun. 2004.
Grue, A., et al., "Improved method for survivable network design based on pre-cross-connected trails". Journal of Optical Networking, vol. 6, No. 2, Feb. 2007.
Kodian, A., et al., "A Disjoint Route-Sets Approach to Design of Path-Protecting p-Cycle Networks". Proc. Workshop on Design of Reliable Communication Networks (DRCN 2005), Ischia (Naples), Italy, Oct. 16-19, 2005, pp. 231-238.
Kodian, A., et al., "Failure-Independent Path-Protecting p-Cycles: Efficient and Simple Fully Preconnected Optical-Path Protection". Journal of Lightwave Technology, vol. 23, No. 10, Oct. 2005.
Luss, H., et al., "Survivable Telecommunications Network Design Under Different Types of Failures". IEEE Transactions on Systems, Mand, and Cybernetics—PartA: Systems and Humans, vol. 34, No. 4, Jul. 2004.
Schupke, D. "Multiple Failure Survivability in WDM Networks with p-Cycles." Proceedings of the 2003 International Symposium on Circuits and Systems, vol. 3, May 25-28, 2003, p. 866-869.
Wang, H. "P-cycles in Multi-Failure Network Survivability." Proceedings of the 2005 7th Interntational Conference on Transparent Optical Networks, vol. 1, Jul. 3-7, 2005, p. 381-384.

*Primary Examiner* — Danny Leung
(74) *Attorney, Agent, or Firm* — Philip J. Feig (57) ABSTRACT

The design of optical telecommunication networks is such that there is provision of end-to-end path restoration to specified demands under up to two links or nodes failures. Restoration routes are provided on Path Protecting Preconfigured Cycles (PP-PCs), where each demand is assigned one or two restoration routes and restoration wavelengths on a segment of one cycle. Splitting of demand across multiple restoration routes is not allowed. All restoration routes and restoration wavelengths are predetermined where multiple demands may share restoration wavelengths without resorting to intermediate switching or wavelength conversions along restoration routes. First, numerous candidate PP-PCs are generated. Assignment of demands with common failure scenarios are allowed, under certain conditions, to the same PP-PC. Next, a set of PP-PCs is selected from among the candidates, while minimizing total reserved restoration wavelengths cost and ensuring that all demands are protected as required. Finally, conflicts of wavelength assignments are resolved.

27 Claims, 2 Drawing Sheets

NETWORK RESTORATION UNDER DUAL FAILURES USING PATH PROTECTING PRECONFIGURED CYCLES

GOVERNMENT LICENSE RIGHTS

This invention was made with U.S. Government support under DARPA contract N00173-08-C-2011. The U.S. government has certain rights in the invention.

FIELD OF THE INVENTION

The present invention relates to the design of survivable optical telecommunications networks where some demands are protected from up to two link or node failures. Specifically, the invention relates to the design of path protecting preconfigured cycles used to restore affected demands instantaneously in the event of one or two failures where the restoration capacity on the cycles can be shared by different demands. The invention focuses primarily on optical networks.

BACKGROUND OF THE INVENTION

Modern telecommunications networks transport an enormous amount of information. Current optical networks are already capable of transporting 100 channels on a single optical fiber, where each channel can carry 40 gigabits per second. Since companies, government agencies, and the military are dependent on receiving uninterrupted service, instantaneous service restoration in the event of link or node failures has become critically important. Even service interruptions for small durations may cause significant disruptions to the exchange of information and may lead to significant financial losses and to inability of executing mission critical tasks.

The present invention focuses on optical networks where almost instantaneous restoration in the event of network failures is critically important. The prior art focuses almost exclusively on restoration under a single failure. However, such protection level may not suffice for mission critical communications. Providing dedicated restoration capacity to each of the demands would provide adequate protection, but would be prohibitively expensive. This invention designs survivable networks with guaranteed end-to-end path restoration using preconfigured cycles for a mix of demands requiring protection from one or two failures. Under normal conditions the working routes of the demands are arbitrary, often referred to as mesh routes. Once affected by a link or node failure, a demand is rerouted onto a preconfigured restoration route, using specified wavelengths, sharing restoration capacity on path protecting preconfigured cycles without resorting to intermediate switching and wavelength conversions. The term "path protection" implies path restoration of an entire working route due to a link or node failure along the working route.

A few prior solutions address restoration under dual failures using preconfigured cycles. The proposed solutions are limited to local preconfigured cycles that provide link restoration rather than end-to-end path restoration. For example, D. A. Schupke, "Multiple Failures Survivability in WDM Networks with p-Cycles", *Proceedings of the International Symposium on Circuits and Systems* (ISCAS 2003), 3, 866-869, May 2003 presents analysis regarding the potential effectiveness of local preconfigured cycles designed to protect against a single failure to provide protection against dual failures. H. Wang and H. T. Mouftah, "P-Cycles in Multi-Failure Network Survivability", *Proceedings of International Conference of Transparent Optical Networks* (ICTON-2005), Volume 1, 381-384, 2005 propose how to use local preconfigured cycles to address dual failures, but restoration after the second failure is not guaranteed. J. Akpuh and J. Doucette, "Enhanced Failure-Specific P-Cycle Network Dual-Failure Restorability Design and Optimization", *Journal of Optical Networking* 8, 1-13, 2009 propose an integer program formulation to design local preconfigured cycles that provide dual protection.

The following articles and patent application describe methods for end-to-end path restoration under a single failure, using preconfigured cycles: A. Kodian and W. D. Grover, "Failure-Independent Path-Protecting p-Cycles: Efficient and Simple Fully Preconnected Optimal-Path Protection", *Journal of Lightwave Technology* 23, 3241-3259, 2005, A. Kodian, W. D. Grover, and J. Doucette, "A Disjoint Rout-Sets Approach to Design of Path-Protecting p-Cycle Networks", *Proceedings of Workshop on Design of Reliable Communication Networks* (DRCN 2005), 231-238, Naples, Italy, October 2005, and D. Baloukov, W. D. Grover, and A. Kodian, "Toward Jointly Optimized Design of Failure-Independent Path Protecting p-Cycle Networks", *Journal of Optical Networking* 7, 62-79, 2008, present a survivable network design method for mesh working routes of the demands, where end-to-end restoration routes are provided on preconfigured cycles. In these prior methods, referred to as the Failure Independent Path Protecting (FIPP) p-cycles methods, multiple demands that do not have any common failure scenarios can be protected by the same cycle. However, their design method does not support the assignment of demands with common failure scenarios on the same cycle. Furthermore, their method allows splitting restoration for multiple-wavelength demands across multiple routes in the same or different cycles. M. I. Eiger, H. Luss, and D. F. Shallcross, "Network Restoration under Link or Node Failure Using Preconfigured Virtual Cycles", U.S. patent application Ser. No. 12/388,981, filed on Feb. 19, 2009 present a survivable network design method which allows the assignment of demands with common failure scenarios on the same cycle. Their method does not allow splitting restoration for multiple-wavelength demands across multiple routes.

T. Y. Chow, F. Chudak, and A. M. Ffrench, "Fast Optical Layer Mesh Protection Using Pre-Cross-Connected Trails", *IEEE/ACM Transactions on Networking* 12, 539-548, 2004, present a survivable network design method that protects mesh working routes of the demands against a single failure on restoration routes, referred to as trails, that are not constrained to be on cycles but are flexible to follow other structures such as paths with or without loops. Their method allows the sharing of restoration capacity of a trail by multiple demands that do not have any common failure scenario. Their method assigns one demand at a time, thus, constructing trails sequentially. Hence, the resulting design of trails depends on the order in which the demands are assigned. A. Grue and W. D. Grover, "Improved Method for Survivable Network Design Based on Pre-Cross-Connected Trails", *Journal of Optical Networking* 6, 200-216, 2007, applied their FIPP p-cycles method to designing trails for restoration, where a trail can support only demands with no common failure scenarios and restoration routes of a demand may be split among multiple trails.

H. Luss and R. T. Wong, "Survivable Telecommunications Network Design Under Different Types of Failures", *IEEE Transactions—SMC, Part A: Systems and Humans* 34, 521-530, 2004, propose a survivable network design method that provides protection from a single failure by constructing a single cycle that includes all end-nodes of the mesh routes of the demands. Restoration routes for all demands are constructed on the cycle using a pre-specified rule, such as using the shortest route on the cycle. Note that using a single cycle for restoring all demands may lead to inefficient use of capacity due to long restoration routes and the need to protect all demands on that cycle. The method is suitable primarily for logical networks (e.g., IP-MPLS); in optical networks a single restoration cycle that includes all end-nodes of the demands may not even exist. Also, the method provides only restoration routes, but does not address the issue of wavelength assignments.

The present invention designs survivable networks which provide end-to-end path protection for demands with mesh routes in the networks, using Path Protecting Preconfigured Cycles (PP-PCs), where some of the demands are protected from a single link or node failure while other demands are protected from two such failures. Restoration routes are provided on segments of cycles where the end-nodes of a working route are the end-nodes of the restoration route for the corresponding demand on the cycle. A demand protected from a single failure is assigned a single restoration route; splitting the demand among multiple restoration routes is not allowed. A demand protected from two failures is assigned two restoration routes, where again splitting the demand among multiple restoration routes is not allowed. The method allows multiple demands to share restoration capacity on a PP-PC. These demands include those with no common failure scenarios as well as selective demands that do have common failure scenarios, thus providing effective sharing of restoration capacity.

SUMMARY OF THE INVENTION

The present invention designs survivable optical networks that provide end-to-end path protection from up to two link or node failures on Path Protecting Preconfigured Cycles (PP-PCs). The working routes of the demands are provided as input and are arbitrary. Some of the demands require protection from a single failure while other demands require protection from two failures. The restoration routes and restoration wavelengths assigned to each of these routes are preconfigured before any failure has occurred. Restoration is achieved without using any intermediate switching or wavelength conversions along restoration routes and it does not allow splitting restoration for multiple-wavelength demands across multiple routes. When the first failure occurs, affected demands are rerouted to their preconfigured first restoration routes without any knowledge of the precise failure location. The two failures may occur almost instantaneously where a demand that requires protection from two failures has sufficient time to become aware whether its first failure restoration route with the specified restoration wavelengths is still available. Upon the occurrence of the second failure, a failed demand that needs further protection is rerouted onto its first failure restoration route, if available; otherwise, it is rerouted onto its second failure restoration route, again, without any knowledge of the precise failure location. If a demand that requires protection from a single failure has been restored upon the first failure occurrence, it is not preempted from its restoration route in the event of a second failure. However, this demand may not be restored again when the second failure occurs. When an end-node of a demand fails, the demand is lost and cannot be restored. For each demand, only a cycle segment that connects its two end-nodes and has no common failure scenarios with the working route of the demand is used for restoration, where the restoration wavelengths assigned to the demand on its restoration route may be shared with restoration routes for other demands.

For each of the demands, the survivable network design method generates multiple PP-PCs that can protect the demand from one or two failures, as needed. The method attempts to assign additional demands to the candidate cycle, provided that they can be protected by the cycle. Some of the candidate PP-PCs protect only demands that require protection from a single failure, while other PP-PCs may protect demands that require protection from one or two failures. The method provides effective sharing of restoration capacity on a PP-PC by assigning demands with no common failure scenarios (also referred to as disjoint demands) as well as some demands with common failure scenarios to the same PP-PC.

The cost of a restoration wavelength on a link depends on the link length. Often, but not always, this cost is simply proportional to the link length. Given the cost of a wavelength on each link, and the restoration routes and restoration wavelengths assigned in a PP-PC, the cost of such PP-PC can be readily computed.

Once all candidate PP-PCs are generated for all demands, the survivable network design method determines an optimal set of selected PP-PCs so that the total restoration wavelengths cost in the network is minimized while each of the demands is assigned to at least one preconfigured cycle. Thereafter, the method adjusts the solution so that each demand would be assigned to precisely one of the selected PP-PCs. Finally, the method reassigns restoration wavelengths, resolving potential conflicts among restoration wavelengths and working routes' wavelengths, and among restoration wavelengths assigned to restoration routes on adjacent PP-PCs that share one or more links. These reassignments also prevent a potential need for intermediate switching along restoration routes.

The present invention designs survivable networks that provide end-to-end path restoration to multiple demands under dual failures using PP-PCs. It uses restoration capacity effectively by facilitating the assignment of multiple demands, including certain demands with common failure scenarios, to a PP-PC where each demand uses a restoration route on only a segment of the cycle. It also enforces rerouting of each of the demands into a single restoration route, which is often a required specification. The method can readily be modified to handle the case where demands can be split across multiple restoration routes upon a failure occurrence. The method can also readily be modified to allow preemption upon the second failure occurrence of restored demands that require protection from a single failure.

The present invention will be more clearly understood when the following description is read in conjunction with the accompanying drawings.

DETAILED DESCRIPTION

Figure 1:
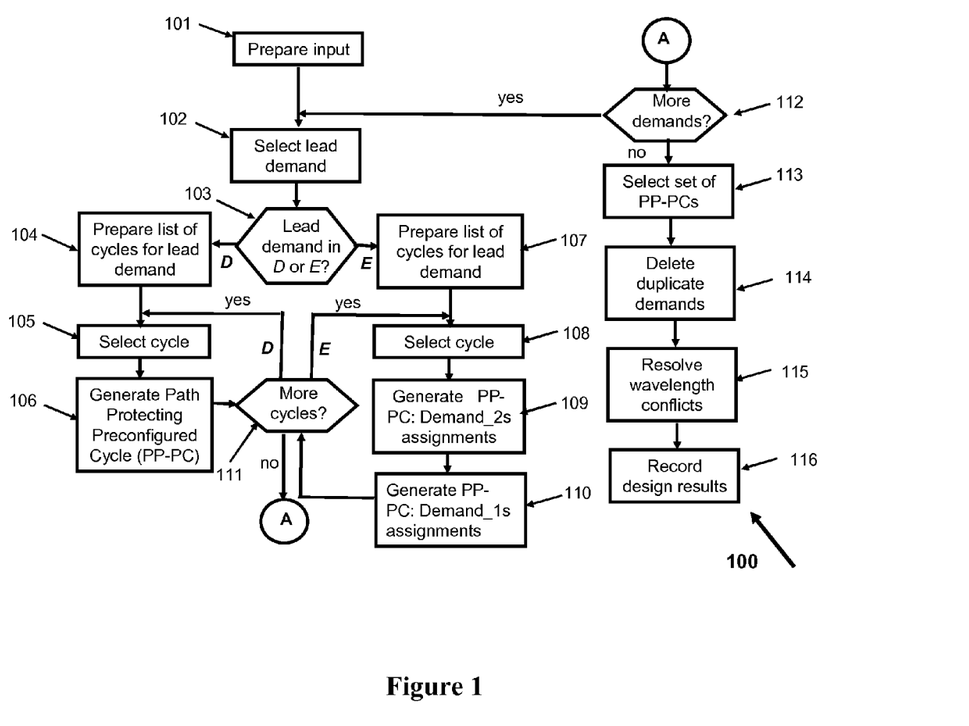
FIG. 1 is a flow chart of a method embodying the present invention that determines a selected set of path protecting preconfigured cycles, the demands assigned to each of these cycles, and the restoration routes and restoration wavelengths assigned to each of the demands.

The present invention designs survivable optical networks that provide end-to-end path protection from any single link or node failure to some demands and from any two link or node failures (two links, one link and one node, or two nodes) to other demands. The restoration routes and the restoration wavelengths assigned to each of these routes are specified on Path Protecting Preconfigured Cycles (PP-PCs), where all these decisions are done before any failure has occurred. A demand protected from a single failure is assigned a single restoration route; splitting the demand among multiple restoration routes is not allowed. A demand protected from two failures is assigned two restoration routes, where again splitting the demand among multiple restoration routes is not allowed. When the first failure occurs, affected demands are rerouted to their preconfigured first restoration routes, using specified restoration wavelengths, without any knowledge of the precise failure location. The dual failures may occur almost instantaneously where the end-nodes of a demand that requires protection from two failures have sufficient time to become aware whether its first failure restoration route with the specified restoration wavelengths is still available. Upon the occurrence of the second failure, a failed demand that needs further protection is rerouted onto its first failure restoration route, if available; otherwise, it is rerouted onto its second failure restoration route, again, without any knowledge of the precise failure location. Restoration is achieved without any intermediate switching or wavelength conversions along restoration routes. If a demand that requires protection from a single failure has been restored upon the first failure occurrence, it is not preempted from its restoration route in the event of a second failure. However, this demand may not be restored again when the second failure occurs. When an end-node of a demand fails, the demand is lost and cannot be restored. Referring now to the figures and to FIG. 1 in particular, there is shown a flow chart of an embodiment of the invention 100 that describes the present invention.

At Step 101, the input is prepared where the input comprises:

G(N, A)=A network where N is the set of nodes and A is the set of links. Notation |·| is used to denote the number of elements in a set; e.g., |N| denotes the number of nodes in the network. A failure in the network refers to a link or a node failure.

d=Index for demands protected from a single failure (referred to as demand_1s), where D is the set of all demand_1s.

e=Index for demands protected from two failures (referred to as demand_2s), where E is the set of all demand_2s.

$P_d$ ($P_e$)=The working route used by demand d (demand e) to connect its end-nodes when demand d (demand e) is not affected by a failure. Typically, the working route of a demand is the shortest path between the end-nodes among the k diverse paths with the smallest total length (k=2 for demand_1 and k=3 for demand_2). Finding these paths can be achieved by solving a min-cost, max-flow network optimization problem. A link "lengths" along a path may be represented by the cost of a wavelength along that link.

$W_d$ ($W_e$)=The set of wavelengths used by demand d (demand e) on its working route.

H=The set of cycles in network G(N, A). This set is obtained by employing known search techniques. The set H needs to be prepared only once for a given network topology and is thereafter used for multiple execution of designing a survivable network for different demand inputs.

h=Index for cycles; h ∈H.

The demands in set D are sorted in non-increasing order of $|W_d|$, and, likewise, the demands in set E are sorted in non-increasing order of $|W_e|$. The sorting is done merely for convenience.

At step 102, a yet unselected demand is selected. This demand is referred to as the lead demand.

At step 103, a check is made whether the lead demand is in set D or in set E. If the lead demand is in D, the method branches to step 104. If the lead demand is in E, the method branches to step 107.

Step 104 is reached from step 103 when the selected lead demand, referred to as $d_1$, is in D. At step 104, all cycles in the set of cycles H that can restore the lead demand $d_1$ in the event of a link or node failure that affect the lead demand are found. A cycle can restore this lead demand if it has a restoration route on the cycle that connects both end-nodes of the demand and that route does not have common failure scenarios with the working route of the lead demand (the restoration and working routes share the end-nodes, but if an end-node fails, the demand is lost). If a demand shares only its two end-nodes with the cycle, it is referred to as straddling demand and it has two possible restoration routes on the cycle (only one of these will be assigned to the demand). If the demand can be restored on the cycle, but is non-straddling, it has one restoration route on the cycle.

At step 105, the method selects a cycle not yet selected from among the cycles that can restore the lead demand $d_1$.

At step 106, a Path Protecting Preconfigured Cycle (PP-PC) is generated, each of which may protect multiple demands that are in D, but none of the demands that are in E. The following notations are used:

$H_d$=The set of cycles in network G(N, A) that can restore demand d. A cycle can restore demand d if both end-nodes of the demand are on the cycle and there is a restoration route on the cycle that has no common failure scenarios with the demand.

c=Index for PP-PCs, where C is the set of all candidate PP-PCs generated.

$D_c$=The set of demands in D assigned to PP-PC c.

$RR_{dc}$=Restoration route selected for demand d ∈$D_c$.

$V_{dc}$=The set of restoration wavelengths used by demand d on $RR_{dc}$. Set $V_{dc}$ may differ from $W_d$, but $|V_{dc}|=|W_d|$.

$S_c$=Cost of PP-PC c defined as the sum over all links of PP-PC c of the number of restoration wavelengths on a link multiplied by the cost of a wavelength on the link. When all the assigned demands are in D, $S_c$ is readily computed from the selected restoration routes and restoration wavelengths for all assigned demands.

Consider the lead demand $d_1$∈D selected in step 102 and cycle $h^+$ selected in step 105. The method generates a PP-PC, referred to as PP-PC $c^+$, by assigning to cycle $h^+$ the lead demand and possibly other demands in D. PP-PC $c^+$ is characterized by cycle $h^+$, the set $D_{c^+}$ of demands assigned, the restoration routes $RR_{dc^+}$ and set of wavelengths $V_{dc^+}$ assigned to each of the demands d∈$D_{c^+}$, and the cost $S_{c^+}$ of the PP-PC. In addition, PP-PC $c^+$ specifies the demand information, including the working route $P_d$ and the set of wavelengths $W_d$ assigned to each of the demands d∈$D_{c^+}$.

Generation of a candidate PP-PC with lead demand in D is described, for example, in M. I. Eiger, H. Luss, and D. F, Shallcross, "Network Restoration under Link or Node Failure Using Preconfigured Virtual Cycles", U.S. patent application Ser. No. 12/388,981, filed on Feb. 19, 2009. It should be noted that in addition to generating candidate PP-PCs with multiple demands, the method also generates a candidate PP-PC that provides dedicated restoration for each lead demand in D.

Step 107 is reached from step 103 when the selected lead demand is in E. The following additional notations are used:

$H_e$=The set of cycles in network G(N, A) that can restore demand e. A cycle can restore demand e if the demand is straddling the cycle.

$E_c$=The set of demands in E assigned to PP-PC c.

$FFRR_{ec}$=First failure restoration route selected for demand $e \in E_c$.
$SFRR_{ec}$=Second failure restoration route selected for demand $e \in E_c$.
$V_{ec}$=The set of restoration wavelengths used by demand e on $FFRR_{ec}$. Set $V_{ec}$ may differ from $W_e$, but $|V_{ec}|=|W_e|$. We assign the same restoration wavelengths on $FFRR_{ec}$ and $SFRR_{ec}$ Consider the lead demand $e_1 \in E$ selected in step 102. At step 107, all cycles in the set of cycles H that can restore the lead demand in the event of two failures that affect the lead demand are found. A cycle can restore this lead demand only if the demand is straddling the cycle; i.e., if the demand shares only its end-nodes with the cycle which implies that the demand has two restoration routes on the cycle. $H_{e_1}$ is the set of cycles that can restore the lead demand $e_1$.

At step 108, the method selects a cycle not yet selected, referred to as cycle $h_1$, from among the set $H_{e_1}$.

At steps 109 and 110, a PP-PC, is generated for the lead demand $e_1 \in E$ selected in step 102 and cycle $h_1$ selected in step 108. The resulting PP-PC is referred to as PP-PC $c_1$ and will be included in the set C of candidate PP-PCs. In step 109 demands in E are added to the PP-PC and in step 110 demands in D are added to the same PP-PC. PP-PC $c_1$ is characterized by cycle $h_1$, the sets $D_{c_1}$ and $E_{c_1}$ of demands assigned to PP-PC $c_1$, the restoration routes $RR_{dc_1}$ and set of restoration wavelengths $V_{dc_1}$ for d $\in D_{c_1}$, the restoration routes $FFRR_{ec_1}$ and $SFRR_{ec_1}$ and the set of restoration wavelengths $V_{ec_1}$ for $e \in E_{c_1}$, and the cost $S_{c_1}$ of PP-PC $c_1$. The cost $S_{c_1}$ is readily computed since, as discussed later, each of the links of PP-PC $c_1$ in our method has $|W_{e_1}|$ restoration wavelengths. In addition, PP-PC $c_1$ specifies the demand information, including the working route $P_d$ and the set of wavelengths $W_d$ assigned to each of the demands $d \in D_{c_1}$, and the working route $P_e$ and the set of wavelengths $W_e$ assigned to each of the demands $e \in E_{c_1}$.

Generation of the candidate PP-PCs with lead demand in E is a critical part of the method and will be explained later in detail.

Step 111 is reached from either step 106 or step 110. At step 111 a check is made whether more PP-PCs can be generated for the lead demand. Suppose step 111 is reached from step 106. If a PP-PC was already generated for each of the cycles in $H_{d_1}$ prepared in step 104, go to step 112; otherwise, return to step 105. Suppose step 111 is reached from step 110. If a PP-PC was already generated for each of the cycles in $H_{e_1}$ prepared in step 107, go to step 112; otherwise, return to step 108

At step 112, a check is made whether all demands in sets D and E were selected in step 102. If not, the method returns to 102 in order to select the next lead demand. If all demands were selected, the method completed the generation of the set C of candidate PP-PCs. It should be noted that the number of candidate PP-PCs in C is a small fraction of all PP-PCs that can be generated. Nevertheless, the method is expected to select a subset of PP-PCs from among those in C which provides protection to all demands at a near-minimum restoration wavelengths cost.

At step 113 a set of PP-PCs is selected. First, identical and dominated PP-PCs are eliminated from the set C of candidate PP-PCs. Consider PP-PCs $c_1$ and $c_2$. If $D_{c_1} \cup E_{c_1} \supseteq D_{c_2} \cup E_{c_2}$ and $S_{c_1} \leq S_{c_2}$, then PP-PC $c_2$ is dominated by $c_1$ and can be deleted from the set C of candidate PP-PCs. Note that if $D_{c_1} \cup E_{c_1} = D_{c_2} \cup E_{c_2}$ and $S_{c_1} = S_{c_2}$, then PP-PCs $c_1$ and $c_2$ are identical, protecting the same set of demands at the same cost, and either one can be deleted. The method then determines an optimal set of PP-PCs from among those remaining in C so that each of the demands in D∪E is assigned to at least one PP-PC while minimizing the cost of selected PP-PCs. This optimization problem is well-known by the name set covering problem and it can be solved by commercially available integer programming software (e.g., the CPLEX software by ILOG Inc, an IBM company). These solvers are capable of solving large set covering problems very fast. Let $x_c$=0, 1 be decision variable where $x_c$=1 if PP-PC c is selected and $x_c$=0 if it is not selected. Let $a_{dc}$=1 if demand $d \in D_c$ and $a_{dc}$=0 otherwise, and let $a_{ec}$=1 if demand $e \in E_c$ and $a_{ec}$=0 otherwise. The set covering problem is formulated as follows:

The Set Covering Problem $$\text{Min} \sum_{c \in C} S_c x_c$$

so that $$\sum_{c \in C} a_{dc} x_c \geq 1, \forall d \in D$$

$$\sum_{c \in C} a_{ec} x_c \geq 1, \forall e \in E$$

$$x_c = 0, 1, \forall c \in C,$$

where C* refers to the optimal set of PP-PCs selected by the solution to the set covering problem.

Some of the demands may be assigned to multiple PP-PCs in C*. At step 114 demands that are assigned to multiple PP-PCs are deleted so that each of these demands will be assigned to a single PP-PC while attempting to maximize the decrease in the cost of the PP-PCs in C*. This can be achieved through various heuristic algorithms, for example, by deleting one demand from one PP-PC at a time; specifically, the demand that results in the largest cost decrease. Note that it is important to delete all duplicate assignments of demands in E first in order to capture the true savings in deleting duplicate assignments of demands in D. A version of such an algorithm is described below.

Elimination of Duplicate Assignments Algorithm

Let the set Q be the subset of demands from among the demands $e \in E$ that are assigned to more than one cycle in C*.

For each demand $e \in Q \cap E_c$, where PP-PC $c \in C^*$, compute the cost reduction in PP-PC c if demand e is deleted from c.

While Q≠∅,

Determine the combination of a demand and a PP-PC from among all $e \in Q \cap E_c$ and $c \in C^*$, referred to as (e*,c*), that yields the largest cost reduction.

Delete demand e* from $E_{c^*}$.

If demand e* is now assigned to only one cycle in C*, delete e* from Q.

Re-compute for each $e \in Q \cap E_{c^*}$ the cost reduction in PP-PC c* if demand e is deleted from c*.

End.

Redefine the set Q as the subset of demands from among the demands $d \in D$ that are assigned to more than one cycle in C*. Repeat the algorithm above for the new set Q with appropriate change of notation (d for e, D for E, and $D_c^*$ for $E_c^*$).

End of Algorithm.

To reduce computation of the cost reductions at the risk of realizing less saving, it may be reasonable to keep restoration routes and wavelength assignments unchanged. Upon completion, a near-optimal solution is obtained with C* as the selected set of PP-PCs, while each of the demands $d \in D$ and $e \in E$ is assigned to exactly one of these PP-PCs.

The method for wavelength assignments during the generation and selection of the PP-PCs ignored (i) possible conflicts between wavelengths assigned to working demands and those assigned to restoration routes, and (ii) possible conflicts between restoration wavelengths assigned in adjacent PP-PCs that share one or more links. Also, note that using the same wavelengths on adjacent PP-PCs that share links might require intermediate switching.

At step 115 an algorithm is provided that guarantees that no wavelength conflicts will occur (and no intermediate switching along restoration routes will be needed) while attempting to minimize the overall number of different wavelengths used for restoration in the network. The input includes:

$RW_c$=Set of restoration wavelengths used in PP-PC c∈C*. Recall that if the lead demand in PP-PC $c_1$ is $d_1$∈D, $RW_{c_1}$={1, 2, . . . , $|W_{d_1}|$}, and if the lead demand is $e_1$∈E, $RW_{c_1}$={1, 2, . . . , $|W_{e_1}|$}.

$WW_c$=Set of wavelengths of working routes of demands d∈D and e∈E which use at least one of the links of PP-PC c ∈C*.

$I_{c_1 c_2}$=1 if PP-PCs $c_1$∈C* and $c_2$∈C* have joint links; otherwise, $I_{c_1 c_2}$=0.

The algorithm determines the set $FRW_C$ of forbidden restoration wavelength that should not be used in PP-PC c, and then revises the restoration wavelength assignments, as needed.

Wavelengths Reassignment Algorithm
  Sort the PP-PCs in C* in non-increasing order of $|RW_c|$.
  Initially, all PP-PCs in C* are unmarked.
  While not all PP-PCs in C* are marked,
  Select from top of the list an unmarked PP-PC, say $c_1$.
  $FRW_{c_1}$=$WW_{c_1}$∪{∪$_c$[$RW_c$:$I_{c_1 c}$=1, c marked]}.
  Let $RW_{c_1}$ and $FRW_{c_1}$ be sorted in increasing order with all wavelengths in $RW_{c_1}$ designated as unmarked.
  While not all wavelengths in $RW_{c_1}$ were selected and marked,
    Select unmarked wavelength from top of list of $RW_{c_1}$, say wavelength r.
    If r∈$FRW_{c_1}$, increase all wavelength numbers r or greater in $RW_{c_1}$ by 1; otherwise, mark wavelength r.
  End.
  Mark PP-PC $c_1$.
End.
End of Algorithm.

At step 116, the completed network design is recorded. The network design protects all demands in E from any two failures and all demands in D from any single failure. The solution comprises the set C* of selected PP-PCs. For each PP-PC c∈C*, the method specifies the sets of assigned demands $D_c$ and $E_c$, where each demand is assigned to a single PP-PC in C*. For each of the demands in $D_c$ the method specifies its assigned restoration route and assigned restoration wavelengths, and for each of the demands in $E_c$ the method specifies its first failure and second failure restoration routes and assigned restoration wavelengths. The cost $S_c$ for each PP-PC c∈C* is also provided.

The discussion below explains how the method generates a PP-PC for a lead demand in E as stated in steps 109 and 110 of FIG. 1.

Figure 2:
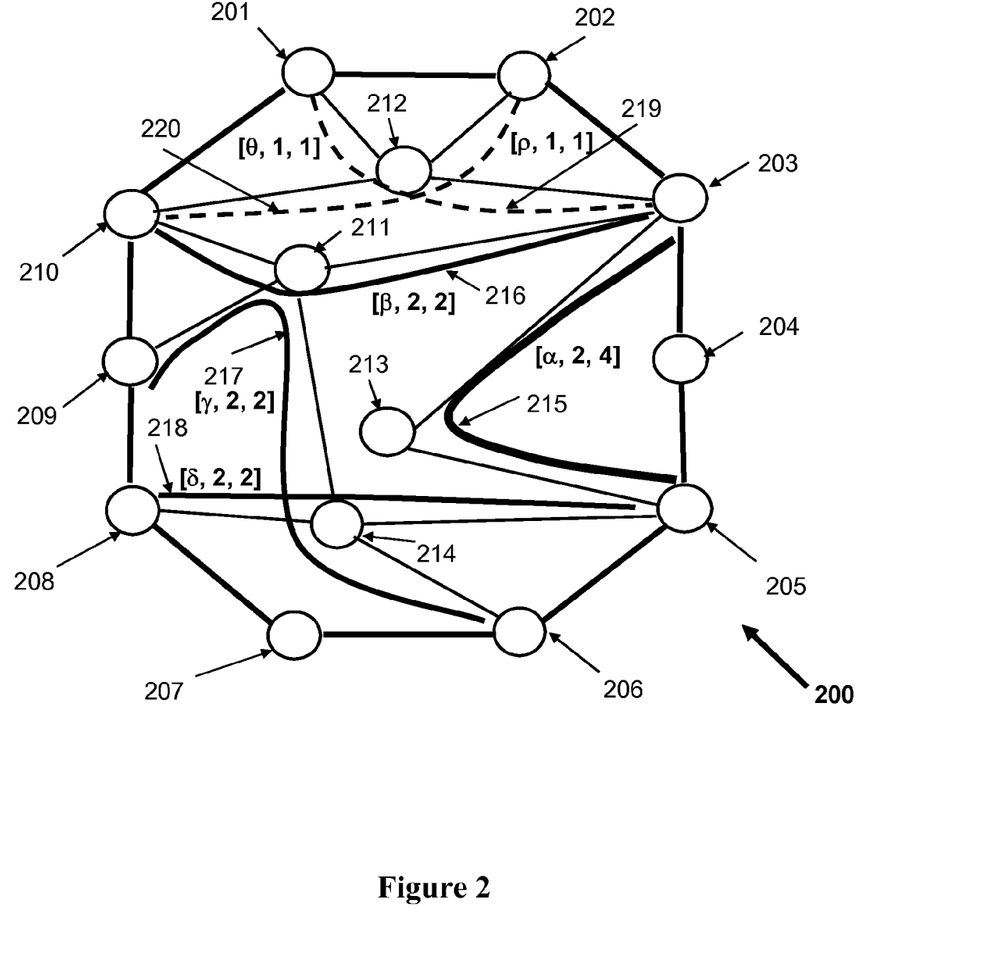
FIG. 2 shows a single path protecting preconfigured cycle and the demands assigned to the cycle.

Referring now to FIG. 2, there is shown an example 200 of a single PP-PC and the demands assigned. Nodes 201 to 210 and the links (identified by the end-nodes) that interconnect these nodes (201, 202), (202, 203), . . . , (209, 210), (210, 201) specify the restoration cycle under consideration. In addition, the figure shows several other nodes 211-214 and several other links that are not on the restoration cycle. The figure shows working routes of six demands 215-220

Each of the demands is specified by three parameters: An index that identifies the demand, the protection level which specifies whether the protection is against any single failure or any dual failures, and the number of restoration wavelengths required (the specific wavelengths used on the working routes are not required here, but are required by the wavelengths reassignment algorithm in order to resolve wavelength conflicts). For example demand 215 is a connection between nodes 203 and 205 and its working route includes links (203, 213) and (213, 205). The demand is specified by the triplet [α, 2, 4]; i.e., it is labeled as demand α, requiring protection from any two failures and consisting of four wavelengths. Note that in FIG. 2 the sets E={α, β, γ, δ} and D={θ, ρ}, and demand 215 refers to demand α, 216 to β, 217 to γ, 218 to δ, 219 to θ, and 220 to ρ.

Consider step 109 in FIG. 1 for the cycle presented in FIG. 2 with demand 215 (demand α) as the lead demand. At step 109, an attempt is made to assign multiple demands in E to the PP-PC without increasing the number of restoration wavelengths above that required for restoring the lead demand. The following illustrates the generation of the corresponding assignments of demands in E when demand α is the lead demand. The method determines the demands in E that can be protected by the PP-PC from any two failures, in this example demands {α, β, γ, δ}. Demand α is assigned first with first failure restoration route (203, 204) and (204, 205) and second failure restoration route (205, 206), (206, 207), . . . , (202, 203) with restoration wavelengths 1, 2, 3 and 4 in both restoration routes. Additional demands in E can be assigned to this PP-PC as long as they can share the same restoration wavelengths (i.e., wavelengths 1, 2, 3 and 4). In the example of FIG. 2 demands β, γ and δ can be assigned as follows: Demand β is assigned first failure restoration route (210, 201), (201, 202), (202, 203), second failure restoration route (203, 204), (204, 205), . . . , (209, 210) with restoration wavelengths 1 and 2 on both restoration routes. Demand γ is assigned first failure restoration route (206, 207), (207, 208), (208, 209), second failure restoration route (209, 210), (210, 201), . . . , (205, 206) with restoration wavelengths 3 and 4 on both restoration routes. Demand δ is assigned first failure restoration route (205, 206), (206, 207), (207, 208), second failure restoration route (208, 209), (209, 210), . . . , (204, 205) with restoration wavelengths 1 and 2 on both restoration routes. Note that demands β and γ, or γ and δ, cannot share restoration wavelengths since they have a common failure scenario, however, since each of them requires only two wavelengths they can be restored on this PP-PC.

The description below further explains the generation of a PP-PC for a lead demand in E. Consider a specific demand $e_1$∈E, referred to as the lead demand, (each demand will serve, in turn, as a lead demand) and a specific cycle $h_1$∈$H_{e_1}$ that can protect $e_1$ from two failures; i.e., demand $e_1$ is straddling in cycle $h_1$. A PP-PC, referred to as PP-PC $c_1$, that will provide restoration to $e_1$ and, perhaps, to other demands in E and in D is generated. Providing protection to demand $e_1$ requires $|W_{e_1}|$ restoration wavelengths on $FFRR_{e_1}$ and on $SFRR_{e_1}$, i.e., on each link of the cycle. Only demands that can be protected by the same cycle without adding restoration wavelengths will be assigned to PP-PC $c_1$. We refer to any two (working or restoration) routes as having a common failure scenario if they share a link or a node, where the shared node is not an end-node of either route.

At step 109 of FIG. 1 an attempt is made to assign additional demands in E to PP-PC $c_1$. Demands are tested for possible assignment to PP-PC $c_1$ one at a time, where lead demand $e_1$ is assigned first with the shorter restoration route declared as $FFRR_{c_1}$ and the other restoration route as $SFRR_{e_1}$. Assuming that there is at most one demand e∈E between a pair of nodes, then, in order to guarantee protection from two failures, $FFRR_e$ of any other candidate demand e must not have any joint link with $FFRR_e$; hence $FFRR_e$ and $SFRR_e$ are uniquely determined. Restoration wavelength assignment is simplified by using greedy assignments where the same, lowest possible, wavelength numbers are assigned on both first and second restoration routes for each of the demands.

The method uses the following algorithm to assign demands in E to PP-PC $c_1$. In the description below, $e_1$ is assigned to PP-PC $c_1$ with $FFRR_{e_1}$ as the shorter restoration route on the cycle. Note that we can generate another PP-PC with $e_1$ as the lead demand and topological cycle $h_1$, where $FFRR_{e_1}$ is the longer restoration route on this cycle.

Dual Failure Protection Assignment Algorithm
Initialization
(a) Assign lead demand $e_1$ to PP-PC $c_1$ with $FFRR_{e_1}$ as the shorter restoration route on the cycle and $SFRR_{e_1}$ as the longer one. Assign restoration wavelength $V_{e_1c_1}=\{1, 2, \ldots, |W_{e_1}|\}$ on each of these routes.
(b) Determine set $LE_{h_1e_1}$ as the set of demands $e \in E \setminus e_1$ that (i) straddle cycle $h_1$, (ii) require no more than $|W_{e_1}|$ restoration wavelengths, (iii) their working routes do not have common failure scenarios with the working route of demand $e_1$, and (iv) have a restoration route with no overlap with $FFRR_{e_1}$. If $LE_{h_1e_1}=\emptyset$, stop.
(c) For each $e \in LE_{h_1e_1}$, determine $FFRR_e$ as the route with no overlap with $FFRR_{e_1}$ and $SFRR_e$ as the other restoration route on the cycle.
(d) Sort demands in $LE_{h_1e_1}$ (i) non-increasing order of $|W_e|$ and (ii) non-decreasing order of $FFRR_e$ length.
Assignment of Demands
While $LE_{h_1e_1} \neq \emptyset$,
 (a) Select a demand from top of the list, referred to as demand e.
 (b) Let S be the set of demands previously assigned to PP-PC $c_1$ whose working routes have common failure scenarios with e or whose first failure restoration route overlaps with $FFRR_e$.
 (c) If $S=\emptyset$, assign e to PP-PC $c_i$ with $V_{ec_1}=\{1, 2, \ldots, |W_e|\}$ on both $FFRR_e$ and $SFRR_e$. Go to Step (e).
 (d) Find the lowest $|W_e|$ wavelength numbers that do not exceed $|W_{e_1}|$ and are not assigned to restoration routes of demands in S. If not available, go to Step (e) below. If available, assign demand e to PP-PC $c_1$ and assign these wavelengths on both $FFRR_e$ and $SFRR_e$.
 (e) Delete e from $LE_{h_1e_1}$.
End.
End of Algorithm.

The output of the algorithm above includes the set of demands $E_{c_1}$ assigned to PP-PC $c_1$. For each demand $e \in E_{c_1}$, the algorithm provides $FFRR_e$ and $SFRR_e$, as well as the set $V_{ec_1}$. The cost $S_{c_1}$ is readily computed as each of the links of PP-PC $c_1$ has $|W_{c_1}|$ restoration wavelengths. At this point, PP-PC $c_1$ is partially generated, protecting one or more demands in E.

Referring back to FIG. 2, observe that the first failure restoration route of demand β covers a restoration route for the demand_1s θ and ρ. Specifically, the first failure restoration route of demand β consists of links (210, 201), (201, 202) and (202, 203) whereas demand θ has a restoration route consisting of links (201, 202), and (202, 203) and demand ρ has a restoration route consisting of links (210, 201) and (201, 202). Hence, demands θ and ρ can be protected from any single failure on PP-PC $c_1$ while preserving the protection from two failures for demands α, β, γ and δ. Since demands θ and ρ have a common failure scenario, they should not share restoration wavelengths. Thus assigning, for example, restoration wavelength 1 to demand θ and restoration wavelength 2 to demand ρ provides adequate protection to these demands.

At step 110 of FIG. 1, demands in D are assigned to PP-PC $c_1$ without adding restoration wavelengths on any of the links along the cycle. Each of the demands $e \in E_{e_1}$ defines a restoration region which includes the restoration wavelengths along $FFRR_e$. Referring to FIG. 2 and the assignments specified before for demands in $E_{c_1}$, demand α defines region α, demand β defines region β, etc, where region α consists of restoration wavelengths 1, 2, 3 and 4 along links (203, 204) and (204, 205), and region β consists of restoration wavelengths 1 and 2 along links (210, 201), (201, 202) and (202, 203). Region 0 is defined as all link-wavelengths not covered by any of the other regions. Thus, in FIG. 2, region 0 includes wavelengths 3 and 4 on links (201, 202), (202, 203), (205, 206) and (210, 201), wavelengths 1, 2 on link (208, 209), and wavelengths 1, 2, 3 and 4 on link (209, 210). Links (203, 204), (204, 205), (206, 207) and (207, 208) have no wavelengths in region 0.

The description below further explains Step 110 of FIG. 1. The method considers assignment of demands $d \in D$ that can be restored within a single region while preserving protection of all previously assigned demands. Index e is used for demands in E and for regions (except for region 0, a region is defined by a demand in E represented by the same index). Thus, demands θ and ρ could be considered for assignments in region β or region 0. The method uses the following algorithm to assign demands in D to PP-PC $c_1$ while preserving the protection from two failures of demands in E already assigned to PP-PC $c_1$.

Single Failure Protection Assignment Algorithm
Initialization
(a) Determine set $LD_{h_1e_1}$ as the set of demands $d \in D$ that (i) can be restored by cycle $h_1$, (ii) require no more than $|W_{e_1}|$ restoration wavelengths, and (iii) whose working routes do not have common failure scenarios with the working route of lead demand $e_1$. If $LD_{h_1e_1}=\emptyset$, stop.
(b) For each $d \in LD_{h_1e_1}$, determine the list of regions, referred to as list $RG_d$, that can restore demand d, and determine $RR_d$ within each of these regions (for simplicity, we do not add subscripts for cycle and region). If none of the regions can restore d, delete d from $LD_{h_1e_1}$.
(c) If $LD_{h_1e_1}=\emptyset$, stop; otherwise, for each $d \in LD_{h_1e_1}$, sort list $RG_d$ in non-decreasing order of the number of restoration wavelengths available at the regions (for region 0, use the smallest number of wavelengths along the links of $RR_d$ in region 0).
Exclusions
For each combination of demand $d \in LD_{h_1e_1}$ and region $e \in RG_d$, Suppose demand $d=d_1$ and region $e=e_2$, where $e_2>0$.
 (a) If the working route of demand $d_1$ has a common failure scenario with the working route of demand $e_2$, delete region $e_2$ from $RG_{d_1}$.
 (b) Suppose the working route of demand $d_1$ has a common failure scenario with the working route of some demand_2, referred to as demand $e_3$, which is also assigned to PP-PC $c_1$ ($e_3 \neq e_2$). If regions $e_3$ and $e_2$ have one or more of the same wavelengths, delete region $e_2$ from $RG_{d_1}$.
 (c) If the working route of demand $d_1$ has a common failure scenario with $SFRR_{e_2}$, delete region $e_2$ from $RG_{d_1}$.
Suppose demand $d=d_1$ and region $e=e_2$, where $e_2=0$.
 (d) If the working route of demand $d_1$ has a common failure scenario with the working route of some demand_2s assigned to PP-PC $c_1$, mark wavelengths of regions defined by these demand_2s as unusable by demand $d_1$ for restoration in region 0.

(e) If the working route of demand $d_1$ has a common failure scenario with the first failure restoration routes of some demand_2s assigned to PP-PC $c_1$, mark wavelengths of these assigned routes as unusable by demand $d_1$ for restoration in region 0.

(f) If the remaining number of restoration wavelengths demand $d_1$ can use in region 0 is less than $|W_{d_1}|$, delete region 0 from the list of demand $d_1$.

End.

Delete from set $LD_{h_1 e_1}$ any demand that has no association left with any region.

Sort demands $d \in LD_{h_1 e_1}$ in (i) non-increasing order of $|W_d|$, and (ii) non-decreasing order of the number of regions associated with the demand.

Assignment of Demands

While not all demands $d \in W_{h_1 e_1}$ were selected,
  Select the next demand $d \in LD_{h_1 e_1}$. Suppose $d = d_1$.
  While not all regions associated with demand $d_1$ were selected,
    Select the next region, say, region r.
    Consider previously assigned demand_1s that are protected in regions different from r and whose working routes have common failure scenarios with the working route of demand $d_1$. Suppose demand $d_2$, protected in region s ($s \neq r$), is among these demands.
      (a) Suppose r>0 and s>0. If $V_{d_2}$ and region r have one or more of the same wavelengths, delete region r from $RG_{d_1}$ and select next region; otherwise, mark wavelengths of region s as unusable by $RR_{d_1}$ in region r.
      (b) Suppose r=0 and s>0. Mark wavelengths of region s as unusable by $RR_{d_1}$ region r.
      (c) Suppose r>0 and s=0. If $V_{d_2}$ and region r have one or more of the same wavelengths, delete region r from $RG_{d_1}$ and select next region.
      (d) If the remaining number of restoration wavelengths that demand $d_1$ can use in region r is less than $|W_{d_1}|$, delete region r from $RG_{d_1}$ and select next region.
    Proceed with assignment attempts of demand $d_1$ in region r.
      (e) Suppose the working route of demand $d_1$ does not share common failure scenarios with the working route of any other demand_1 previously assigned to PP-PC $c_1$ in region r. Then, assign $d_1$ to region r with $RR_{d_1}$ in this region, determine set $V_{d_1 c_1}$ as the lowest $|W_{d_1}|$ wavelength numbers that demand $d_1$ can use in region r, and go to next $d \in LD_{h_1 e_1}$.
      (f) Suppose the working route of demand $d_1$ shares common failure scenarios with the working routes of some previously assigned demand_1s to PP-PC $c_1$ in region r, but $RR_{d_1}$ in region r does not overlap with any restoration routes assigned to these demands. Then, assign $d_1$ to region r with $RR_{d_1}$ in this region, determine set $V_{d_1 c_1}$ as the lowest $|W_{d_1}|$ wavelength numbers that demand $d_1$ can use in region r, and go to next $d \in LD_{h_1 e_1}$.
      (g) Suppose the working route of demand $d_1$ shares common failure scenarios with the working routes of a set T of demand_1s previously assigned to PP-PC $c_1$ in region r, and $RR_{d_1}$ in region r overlaps with the restoration route of each of the demands in T. Then,
        1. Mark restoration wavelengths of all demands in T as unusable by demand $d_1$ for restoration in region r.
        2. If the remaining number of restoration wavelengths demand $d_1$ can use in region r is at least $|W_{d_1}|$, then, assign $d_1$ to region r with $RR_{d_1}$ in this region, determine the set $V_{d_1 c_1}$ as the lowest $|W_{d_1}|$ wavelength numbers that demand $d_1$ can use in region r, and go to next $d \in LD_{h_1 e_1}$. Otherwise, delete region r from the list of demand $d_1$ and select next region.
      End.
    End.
End of Algorithm.

The output of the algorithm above includes the set of demands $D_{c_1}$ assigned to PP-PC $c_1$. For each demand $d \in D_{c_1}$, the algorithm also provides $RR_d$ as well as the set $V_{d c_1}$ of restoration wavelengths. Note that the set of assigned demands $D_{c_1}$ does not affect the cost $S_{c_1}$.

The Single Failure Protection Assignment Algorithm can readily be modified to handle the case where demands in D that have been restored when the first failure has occurred can be preempted from their restoration route when the second failure occurs.

The output of the Single Failure Protection Assignment Algorithm, combined with the output of the Dual Failure Protection Assignment Algorithm, provide PP-PC $c_1$.

This completes the detailed description of generating PP-PC $c_1$, as noted in steps 109 and 110 of FIG. 1. The present invention can readily be modified to handle the case when restoration routes of each of the demands can be split among multiple routes. While generating candidate PP-PCs, each demand is assumed to require only one wavelength, and the set covering problem used for selecting an optimal set of PP-PCs needs to be modified so that each of the cycles may be selected multiple times and so that each of the demands $d \in D$ will be assigned at least $|W_d|$ times and each of the demands $e \in E$ will be assigned at least $|W_e|$ times.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc. A module may be a component of a device, software, program, or system that implements some "functionality", which can be embodied as software, hardware, firmware, electronic circuitry, or etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server, and/or embedded system.

While there has been described and illustrated a method for network restoration under dual failures using preconfigured cycles, it will be apparent to those skilled in the art that modifications and variations are possible without deviating from the principles and broad teachings of the present invention which shall be limited solely by the scope of the claims appended hereto.

What is claimed is:

1. A method for designing a survivable optical network that provides end-to-end path restoration to a plurality of demands in the event of a single link or node failure and to a plurality of demands in the event of any two such failures using a plurality of path protecting preconfigured cycles, where in the event of the first or second failure each of the affected demands is rerouted onto a single preconfigured restoration route on a segment of a cycle using pre-specified restoration wavelengths without resorting to intermediate switching or wavelength conversions on the restoration route, comprising the steps of:
   a. providing an optical network comprising a plurality of nodes connected by links forming paths;
   b. generating a plurality of candidate path protecting preconfigured cycles where each of the preconfigured cycles is generated by using Dual Failure Protection Assignment Algorithm to assign demands to the cycle that require protection from any two failures and by using Single Failure Protection Assignment Algorithm to assign demands to the cycle that require protection from any single failure and where such demands restored upon first failure occurrence cannot be preempted upon the second failure occurrence, resulting in a path protecting preconfigured cycle that protects some assigned demands from two failures and some assigned demands from a single failure;
   c. generating an additional plurality of candidate path protecting preconfigured cycles where each of the preconfigured cycles is generated by using known methods to assign demands to the cycle that require protection from any single failure, resulting in a path protecting preconfigured cycle that protects all assigned demands from a single failure;
   d. selecting a set of path protecting preconfigured cycles from among all candidate path protecting preconfigured cycles so that each of the demands is protected by a single cycle by solving Set Covering Problem followed by using Elimination of Duplicate Assignments Algorithm while achieving a near-minimum total restoration wavelengths cost in the network;
   e. resolving wavelength conflicts that occur upon the first or second failure occurrence among restoration routes and demand working routes and among restoration routes on different path protecting preconfigured cycles that share one or more links, and preventing need for intermediate switching along restoration routes, by using Wavelengths Reassignment Algorithm; and
   f. incorporating the plurality of selected path protecting preconfigured cycles, demands assigned to each of the cycles, a first failure restoration route and a second failure restoration route and restoration wavelengths assigned to each demand that requires protection from two failures, and a single restoration route and restoration wavelengths assigned to each of the demands that requires protection from a single failure for converting the optical network into the survivable optical network.

2. The method as set forth in claim 1, wherein in the event of a failure each of the affected demands is rerouted onto a single preconfigured restoration route on a segment of a path protecting preconfigured cycle without any knowledge of the precise failure location.

3. The method as set forth in claim 1, wherein in the event of any two failures where the failures occur sequentially, including almost instantaneously, so that all path protecting preconfigured cycles, restoration routes and restoration wavelengths are determined before the first failure has occurred; where upon occurrence of a second failure affected demands that require protection from two failures are aware whether their first failure restoration route is still available or not, and if available the demand is rerouted onto its first failure restoration route and if not available the demand is rerouted onto its second failure restoration route.

4. The method as set forth in claim 1, wherein said generating a plurality of candidate path protecting preconfigured cycles finds for each demand, referred to as lead demand, all topological cycles in the network that can restore the lead demand from one or from two failures, as required by said lead demand, and generates a candidate path protecting preconfigured cycle which protects one or more demands for each combination of the lead demand and a topological cycle.

5. A method for designing a survivable optical network that provides end-to-end path restoration to a plurality of demands in the event of a single link or node failure and to a plurality of demands in the event of any two such failures using a plurality of path protecting preconfigured cycles, where in the event of the first or second failure each of the affected demands is rerouted onto a single preconfigured restoration route on a segment of a cycle using pre-specified restoration wavelengths without resorting to intermediate switching or wavelength conversions on the restoration route, comprising the steps of:
   a. providing an optical network comprising a plurality of nodes connected by links forming paths;
   b. generating a plurality of candidate path protecting preconfigured cycles where each of the preconfigured cycles protect some assigned demands from two failures and some assigned demands from a single failure;
   c. generating additional plurality of candidate path protecting preconfigured cycles where each of the preconfigured cycles is generated by using known methods to assign demands that require protection from any single failure, resulting in a path protecting preconfigured cycle that protects all assigned demands from a single failure;
   d. selecting a set of path protecting preconfigured cycles from among all candidate preconfigured cycles so that each of the demands is protected by a single cycle while achieving a near-minimum total restoration wavelengths cost in the network;
   e. resolving wavelength conflicts that occur upon the first or second failure occurrence among restoration routes and demand working routes and among restoration routes on different path protecting preconfigured cycles that share one or more links, and preventing need for intermediate switching along restoration routes; and
   f. incorporating the plurality of selected path protecting preconfigured cycles, demands assigned to each of the cycles, a first failure restoration route and a second failure restoration route and restoration wavelengths assigned to each demand that requires protection from two failures, and a single restoration route and restoration wavelengths assigned to each of the demands that requires protection from a single failure for converting the optical network into the survivable optical network.

6. The method as set forth in claim 5, wherein said generating a plurality of candidate path protecting preconfigured cycles uses Dual Failure Protection Assignment Algorithm followed by Single Failure Protection Assignment Algorithm to generate a path protecting preconfigured cycle where demands that require protection from a single failure and are restored upon first failure occurrence cannot be preempted upon the second failure occurrence and where the number of restoration wavelengths on each link of the cycle is equal to the number of wavelengths of the demand with the largest number of required wavelengths which is protected from two failures by said cycle.

7. The method as set forth in claim 5, wherein a path protecting preconfigured cycle may protect multiple demands with common failure scenarios.

8. The method as set forth in claim 5, wherein said selecting a set of path protecting preconfigured cycles uses Set Covering Problem followed by using Elimination of Duplicate Assignments Algorithm.

9. The method as set forth in claim 5, wherein said resolving wavelength conflicts uses Wavelengths Reassignment Algorithm.

10. The method as set forth in claim 5, wherein in the event of a failure each of the affected demands is rerouted onto a single preconfigured restoration route on a segment of a path protecting preconfigured cycle without any knowledge of the precise failure location.

11. The method as set forth in claim 5, wherein in the event of any two failures the failures occur sequentially, including almost instantaneously, so that all path protecting preconfigured cycles, restoration routes and restoration wavelengths are determined before the first failure has occurred, where upon occurrence of a second failure affected demands that require protection from two failures are aware whether their first failure restoration route is still available or not, and if available the demand is rerouted onto its first failure restoration route and if not available the demand is rerouted onto its second failure restoration route.

12. A computer readable medium having computer readable program for operating on a computer for designing a survivable optical network from an optical network comprising a plurality of nodes connected by links that provide end-to-end path restoration to a plurality of demands in the event of a single link or node failure and to a plurality of demands in the event of any two such failures using a plurality of path protecting preconfigured cycles, where in the event of the first or second failure each of the affected demands is rerouted onto a single preconfigured restoration route on a segment of a cycle using pre-specified restoration wavelengths without resorting to intermediate switching or wavelength conversions on the restoration route, comprising the steps of:

a. generating a plurality of candidate path protecting preconfigured cycles where each of the preconfigured cycles is generated by using Dual Failure Protection Assignment Algorithm to assign demands to the cycle that require protection from any two failures and by using Single Failure Protection Assignment Algorithm to assign demands to the cycle that require protection from any single failure and where such demands restored upon first failure occurrence cannot be preempted upon the second failure occurrence, resulting in a path protecting preconfigured cycle that protects some assigned demands from two failures and some assigned demands from a single failure;

b. generating an additional plurality of candidate path protecting preconfigured cycles where each of the preconfigured cycles is generated by using known methods to assign demands to the cycle that require protection from any single failure, resulting in a path protecting preconfigured cycle that protects all assigned demands from a single failure;

c. selecting a set of path protecting preconfigured cycles from among all candidate path protecting preconfigured cycles so that each of the demands is protected by a single cycle by solving Set Covering Problem followed by using Elimination of Duplicate Assignments Algorithm while achieving a near-minimum total restoration wavelengths cost in the network;

d. resolving wavelength conflicts that occur upon the first or second failure occurrence among restoration routes and demand working routes and among restoration routes on different path protecting preconfigured cycles that share one or more links, and preventing need for intermediate switching along restoration routes, by using the Wavelengths Reassignment Algorithm; and e. incorporating the plurality of selected path protecting preconfigured cycles, demands assigned to each of the cycles, a first failure restoration route and a second failure restoration route and restoration wavelengths assigned to each demand that requires protection from two failures, and a single restoration route and restoration wavelengths assigned to each of the demands that requires protection from a single failure for converting the optical network into the survivable optical network.

13. The computer readable medium as set forth in claim 12, wherein in the event of a failure each of the affected demands is rerouted onto a single preconfigured restoration route on a segment of a path protecting preconfigured cycle without any knowledge of the precise failure location.

14. The computer readable medium as set forth in claim 12, wherein in the event of any two failures where the failures occur sequentially, including almost instantaneously, so that all path protecting preconfigured cycles, restoration routes and restoration wavelengths are determined before the first failure has occurred; where upon occurrence of a second failure affected demands that require protection from two failures are aware whether their first failure restoration route is still available or not, and if available the demand is rerouted onto its first failure restoration route and if not available the demand is rerouted onto its second failure restoration route.

15. The computer readable medium as set forth in claim 12, wherein said generating a plurality of candidate path protecting preconfigured cycles finds for each demand, referred to as lead demand, all possible topological cycles in the network that can restore the lead demand from one or from two failures, as required by said lead demand, and generates a candidate path protecting preconfigured cycle which protects one or more demands for each combination of the lead demand and a topological cycle.

16. A computer readable medium having computer readable program for operating on a computer for designing a survivable optical network from an optical network comprising a plurality of nodes connected by links that provides end-to-end path restoration to a plurality of demands in the event of a single link or node failure and to a plurality of demands in the event of any two such failures using a plurality of path protecting preconfigured cycles, where in the event of the first or second failure each of the affected demands is rerouted onto a single preconfigured restoration route on a segment of a cycle using pre-specified restoration wavelengths without resorting to intermediate switching or wavelength conversions on the restoration route, comprising the steps of:

a. generating a plurality of candidate path protecting preconfigured cycles where each of the preconfigured cycles protect some assigned demands from two failures and some assigned demands from a single failure;

b. generating additional plurality of candidate path protecting preconfigured cycles where each of the preconfigured cycles is generated by using known methods to assign demands that require protection from any single failure, resulting in a path protecting preconfigured cycle that protects all assigned demands from a single failure;

c. selecting a set of path protecting preconfigured cycles from among all candidate preconfigured cycles so that each of the demands is protected by a single cycle while achieving a near-minimum total restoration wavelengths cost in the network;

d. resolving wavelength conflicts that occur upon the first or second failure occurrence among restoration routes and demand working routes and among restoration routes on different path protecting preconfigured cycles that share one or more links, and preventing need for intermediate switching along restoration routes; and e. incorporating the plurality of selected path protecting preconfigured cycles, demands assigned to each of the cycles, a first failure restoration route and a second failure restoration route and restoration wavelengths assigned to each demand that requires protection from two failures, and a single restoration route and restoration wavelengths assigned to each of the demands that requires protection from a single failure for converting the optical network into the survivable optical network.

17. The computer readable medium as set forth in claim 16, wherein said generating a plurality of candidate path protecting preconfigured cycles uses Dual Failure Protection Assignment Algorithm followed by Single Failure Protection Assignment Algorithm to generate a path protecting preconfigured cycle where demands that require protection from a single failure and are restored upon first failure occurrence cannot be preempted upon the second failure occurrence and where the number of restoration wavelengths on each link of the cycle is equal to the number of wavelengths of the demand with the largest number of required wavelengths which is protected from two failures by said cycle.

18. The computer readable medium as set forth in claim 16, wherein said selecting a set of path protecting preconfigured cycles uses Set Covering Problem followed by using Elimination of Duplicate Assignments Algorithm.

19. The computer readable medium as set forth in claim 16, wherein said resolving wavelength conflicts uses Wavelengths Reassignment Algorithm.

20. A computer system for designing a survivable optical network from an optical network comprising a plurality of nodes connected by links that provide end-to-end path restoration to a plurality of demands in the event of a single link or node failure and to a plurality of demands in the event of any two such failures using a plurality of path protecting preconfigured cycles, where in the event of the first or second failure each of the affected demands is rerouted onto a single preconfigured restoration route on a segment of a cycle using pre-specified restoration wavelengths without resorting to intermediate switching or wavelength conversions on the restoration route, comprising:

a. means for generating a plurality of candidate path protecting preconfigured cycles where each of the preconfigured cycles is generated by using Dual Failure Protection Assignment Algorithm to assign demands to the cycle that require protection from any two failures and by using Single Failure Protection Assignment Algorithm to assign demands to the cycle that require protection from any single failure and where such demands restored upon first failure occurrence cannot be preempted upon the second failure occurrence, resulting in a path protecting preconfigured cycle that protects some assigned demands from two failures and some assigned demands from a single failure;

b. means for generating an additional plurality of candidate path protecting preconfigured cycles where each of the preconfigured cycles is generated by using known methods to assign demands to the cycle that require protection from any single failure, resulting in a path protecting preconfigured cycle that protects all assigned demands from a single failure;

c. means for selecting a set of path protecting preconfigured cycles from among all candidate path protecting preconfigured cycles so that each of the demands is protected by a single cycle by solving Set Covering Problem followed by using Elimination of Duplicate Assignments Algorithm while achieving a near-minimum total restoration wavelengths cost in the network;

d. means for resolving wavelength conflicts that occur upon the first or second failure occurrence among restoration routes and demand working routes and among restoration routes on different path protecting preconfigured cycles that share one or more links, and preventing need for intermediate switching along restoration routes, by using Wavelengths Reassignment Algorithm; and e. means for incorporating the plurality of selected path protecting preconfigured cycles, demands assigned to each of the cycles, a first failure restoration route and a second failure restoration route and restoration wavelengths assigned to each demand that requires protection from two failures, and a single restoration route and restoration wavelengths assigned to each of the demands that requires protection from a single failure for converting the optical network into the survivable optical network.

21. The computer system as set forth in claim 20, wherein in the event of a failure each of the affected demands is rerouted onto a single preconfigured restoration route on a segment of a path protecting preconfigured cycle without any knowledge of the precise failure location.

22. The computer system as set forth in claim 20, wherein in the event of any two failures where the failures occur sequentially, including almost instantaneously, so that all path protecting preconfigured cycles, restoration routes and restoration wavelengths are determined before the first failure has occurred; where upon occurrence of a second failure affected demands that require protection from two failures are aware whether their first failure restoration route is still available or not, and if available the demand is rerouted onto its first failure restoration route and if not available the demand is rerouted onto its second failure restoration route.

23. The computer system as set forth in claim 20, wherein said generating a plurality of candidate path protecting preconfigured cycles finds for each demand, referred to as lead demand, all possible topological cycles in the network that can restore the lead demand from one or from two failures, as required by said lead demand, and generates a candidate path protecting preconfigured cycle which protects one or more demands for each combination of the lead demand and a topological cycle.

24. A computer system for designing a survivable optical network that provides end-to-end path restoration to a plurality of demands in the event of a single link or node failure and to a plurality of demands in the event of any two such failures using a plurality of path protecting preconfigured cycles, where in the event of the first or second failure each of the affected demands is rerouted onto a single preconfigured restoration route on a segment of a cycle using pre-specified restoration wavelengths without resorting to intermediate switching or wavelength conversions on the restoration route, comprising:
  a. an optical network comprising nodes connected by links;
  b. a means for generating a plurality of candidate path protecting preconfigured cycles where each of the preconfigured cycles protect some assigned demands from two failures and some assigned demands from a single failure;
  c. means for generating additional plurality of candidate path protecting preconfigured cycles where each of the preconfigured cycles is generated by using known methods to assign demands that require protection from any single failure, resulting in a path protecting preconfigured cycle that protects all assigned demands from a single failure;
  d. means for selecting a set of path protecting preconfigured cycles from among all candidate preconfigured cycles so that each of the demands is protected by a single cycle while achieving a near-minimum total restoration wavelengths cost in the network;
  e. means for resolving wavelength conflicts that occur upon the first or second failure occurrence among restoration routes and demand working routes and among restoration routes on different path protecting preconfigured cycles that share one or more links, and preventing need for intermediate switching along restoration routes; and
  f. means for incorporating the plurality of selected path protecting preconfigured cycles, demands assigned to each of the cycles, a first failure restoration route and a second failure restoration route and restoration wavelengths assigned to each demand that requires protection from two failures, and a single restoration route and restoration wavelengths assigned to each of the demands that requires protection from a single failure for converting the optical network into the survivable optical network.

25. The computer system as set forth in claim 24, wherein said means for generating a plurality of candidate path protecting preconfigured cycles uses Dual Failure Protection Assignment Algorithm followed by Single Failure Protection Assignment Algorithm to generate a path protecting preconfigured cycle where demands that require protection from a single failure and are restored upon first failure occurrence cannot be preempted upon the second failure occurrence and where the number of restoration wavelengths on each link of the cycle is equal to the number of wavelengths of the demand with the largest number of required wavelengths which is protected from two failures by said cycle.

26. The computer system as set forth in claim 24, wherein said means for selecting a set of path protecting preconfigured cycles uses Set Covering Problem followed by using Elimination of Duplicate Assignments Algorithm.

27. The computer system as set forth in claim 24, wherein said means for resolving wavelength conflicts uses Wavelengths Reassignment Algorithm.

\* \* \* \* \*